(12) United States Patent
Acquarulo, Jr. et al.

(10) Patent No.: US 7,279,521 B2
(45) Date of Patent: *Oct. 9, 2007

(54) NYLON NANOCOMPOSITES

(75) Inventors: Lawrence A. Acquarulo, Jr., Lisbon, CT (US); Charles J. O'Neil, Chelmsford, MA (US)

(73) Assignee: Foster Corporation, Putnam, CT (US)

( * ) Notice: Subject to any disclaimer, the term of this patent is extended or adjusted under 35 U.S.C. 154(b) by 56 days.

This patent is subject to a terminal disclaimer.

(21) Appl. No.: 10/379,763

(22) Filed: Mar. 5, 2003

(65) Prior Publication Data

US 2003/0229184 A1 Dec. 11, 2003

Related U.S. Application Data

(63) Continuation-in-part of application No. 10/129,921, filed as application No. PCT/US00/31174 on Nov. 13, 2000, now Pat. No. 6,833,392.

(60) Provisional application No. 60/164,589, filed on Nov. 10, 1999.

(51) Int. Cl.
*C08K 3/34* (2006.01)
*C08L 53/00* (2006.01)

(52) U.S. Cl. .............. 524/445; 524/447; 524/505; 977/DIG. 1

(58) Field of Classification Search ........ 524/445, 524/446, 447, 186; 501/145
See application file for complete search history.

(56) References Cited

U.S. PATENT DOCUMENTS

| | | | |
|---|---|---|---|
| 4,031,164 A | 6/1977 | Hedrick et al. | 260/857 PG |
| 4,303,595 A | 12/1981 | Allen | 260/746 |
| 4,528,235 A | 7/1985 | Sacks et al. | 428/220 |
| 4,618,528 A | 10/1986 | Sacks et al. | 428/216 |
| 4,671,355 A | 6/1987 | Strange | 166/171 |
| 4,739,007 A | 4/1988 | Okada et al. | 524/789 |
| 4,810,734 A | 3/1989 | Kawasumi et al. | 523/216 |
| 4,874,728 A | 10/1989 | Eilliott et al. | 501/148 |
| 4,889,885 A | 12/1989 | Usuki et al. | 524/445 |
| 4,889,895 A | 12/1989 | Chernega et al. | 525/278 |
| 4,894,411 A | 1/1990 | Okada et al. | 524/710 |
| 4,937,297 A * | 6/1990 | Dean | 525/425 |
| 4,960,836 A * | 10/1990 | DeRudder | 525/423 |
| 5,168,108 A * | 12/1992 | Chacko et al. | 524/538 |
| 5,198,551 A | 3/1993 | Benicewicz et al. | 548/435 |
| 5,267,959 A | 12/1993 | Forman | 604/103 |
| 5,385,776 A | 1/1995 | Maxfield et al. | 428/297 |
| 5,501,759 A | 3/1996 | Forman | 156/272.8 |
| 5,554,670 A | 9/1996 | Giannelis et al. | 523/209 |
| 5,584,821 A | 12/1996 | Hobbs et al. | 604/280 |
| 5,691,412 A * | 11/1997 | Matsumura et al. | 525/66 |
| 5,747,560 A | 5/1998 | Christiani et al. | 523/209 |
| 5,749,857 A | 5/1998 | Cuppy | 604/164 |
| 5,760,106 A | 6/1998 | Pinnavaia et al. | 523/209 |
| 5,853,886 A | 12/1998 | Pinnavaia et al. | 428/403 |
| 5,993,414 A | 11/1999 | Haller | 604/93 |
| 5,998,551 A * | 12/1999 | O'Neil et al. | 525/426 |
| 6,139,525 A | 10/2000 | Davis-Lemessy et al. | 604/103 |
| 6,262,162 B1 * | 7/2001 | Lan et al. | 524/445 |
| 6,579,927 B1 * | 6/2003 | Fischer | 524/445 |
| 6,767,952 B2 * | 7/2004 | Dontula et al. | 524/445 |
| 6,833,392 B1 * | 12/2004 | Acquarulo et al. | 522/83 |
| 7,034,071 B2 * | 4/2006 | Acquarulo et al. | 524/445 |
| 2002/0143094 A1 | 10/2002 | Conroy et al. | 524/445 |
| 2003/0013796 A1 | 1/2003 | Turner et al. | 524/445 |
| 2003/0100656 A1 * | 5/2003 | Majumdar et al. | 524/445 |

FOREIGN PATENT DOCUMENTS

| | | |
|---|---|---|
| DE | 3808623 | 10/1988 |
| EP | 0352042 | 1/1990 |
| EP | 0358415 | 3/1990 |
| EP | 0398551 | 11/1990 |
| EP | 0839634 A2 | 5/1998 |
| EP | 1 038 834 A1 | 9/2000 |
| JP | 2208358 | 8/1990 |
| WO | WO93/11190 | 6/1993 |
| WO | WO99/07790 * | 2/1999 |
| WO | WO 01/34385 | 5/2001 |
| WO | WO 02/02171 A2 | 1/2002 |

OTHER PUBLICATIONS

"Nanoclays-Couting on Consistency" by Bob Briell, from http://www.nanoclay.com/pubs/Nanoclays%20-%20Counting%20on%20Consistency.htm,Jan. 22, 2003.

(Continued)

Primary Examiner—Tae H Yoon
(74) Attorney, Agent, or Firm—Grossman, Tucker, Perreault & Pfleger, PLLC

(57) ABSTRACT

A method for modifying the properties of a nylon block copolymer comprising: supplying a nylon block copolymer wherein the nylon block copolymer has a flexural modulus, a tensile modulus, and an unnotched Izod impact strength. Incorporated into the nylon block copolymer is a nanoclay filler wherein the nanoclay filler is present at a level of between about 1.0-20.0 wt. %. The addition of the nanoclay filler serves to increase the values of the nylon block copolymer's flexural modulus, tensile modulus, while substantially maintaining the value of the unnotched Izod impact strength and/or increasing the value of said unnotched Izod impact strength, upon addition of the nanoclay filler.

11 Claims, 1 Drawing Sheet

OTHER PUBLICATIONS

"Nanocomposites—A Little Goes A Long Way" by Lilli Manolis Sherman, from http://www.plasticstechnology.com/Scripts/SP-MainPT.asp?file=d:\plasticstechnology.co . . . ,Jun. 1999.

"Tensile strength of epidural catheters" by R Blackshear, from http:www.manbit.com/oa/c42.htm, Jan. 23, 2003.

"Nanocomposites Broaden Roles in Automotive Barrier Packaging" by Robert Leaversuch, from http://www.plasticstechnology.com/Scripts/SP-MainPT.asp?file=d:\plasticstechnology.co . . . ,Jan. 22, 2003.

"RTP Company Product Data Sheet" from http://www.rtpcompany.com/info/data/0200F/RTP200F.htm,Jan. 23, 2003.

* cited by examiner

NYLON NANOCOMPOSITES

CROSS REFERENCE TO RELATED APPLICATIONS

This application is a continuation-in-part of pending U.S. application Ser. No. 10/129,921 filed Feb. 5, 2003, now U.S. Pat. No. 6,833,392 which is the National Stage of International Application No. PCT/US00/31174 filed Nov. 13, 2000 and published May 17, 2001 as International Publication No. WO 01/34685, designating the United States, and which claims benefit of U.S. Provisional Application No. 60/164,589 filed Nov. 10, 1999.

FIELD OF THE INVENTION

The present invention relates to nylon-based nanocomposites, wherein nylon polymers may be combined with a nanoclay to provide a unique and overall synergistic effect on the mechanical, thermal and barrier properties of the nanocomposite, the composition being particularly suitable for the manufacture of medical and surgical instruments, such as a catheter or similar device.

BACKGROUND OF THE INVENTION

Polymer composites comprising a polymer matrix having one or more additives such as a particulate or fiber material dispersed throughout the continuous polymer matrix are well known. The additive is often included to enhance one or more properties of the polymer. Useful additives include inorganic layered materials such as talc, clays and mica of micron size or glass fibers of various lengths. Generally, the addition of a filler enhances some properties, such as stiffness or tensile strength, at the expense of other properties, such as elongation or impact strength. In addition, fiber type reinforcements tend to improve impact strength while particulate type additives tend to have the opposite effect (i.e., lower impact strength). Furthermore, in either case, the exact influence of an additive on a given property may be a function of filler level and specific filler-resin interactions.

Nanocomposites are a new class of materials revealing characteristics, relative to traditional fillers, of significantly improving mechanical properties. Nanocomposites typically use relatively small amounts, usually less than 10%, of nanometer-sized particles to reinforce a polymer. They reportedly offer significantly enhanced mechanical, thermo-mechanical and barrier properties when the nanometer-sized particles are properly treated and dispersed into the polymer.

A number of techniques have been described for dispersing inorganic layered materials into a polymer matrix. It has been suggested to disperse individual layers, e.g., platelets, of the layered inorganic material, throughout the polymer. However, without some additional treatment, the polymer will not sufficiently infiltrate into the space between the layers of the additive and the layers of the inorganic material will not be sufficiently uniformly dispersed in the polymer.

To provide a more uniform dispersion, as described in U.S. Pat. No. 4,889,895, sodium or potassium ions normally present in natural forms of mica-type silicates and other multilayered particulate materials are exchanged with organic cations (e.g., alkylammonium ions or suitably functionalized organosilanes) thereby intercalating the individual layers of the multilayered materials, generally by ionic exchange of the sodium or potassium ions. This intercalation can render the normally hydrophilic mica-type silicates organophilic and expand the interlayer distance. Subsequently, the layered material (conventionally referred to as "nanofiller") is mixed with a monomer and/or oligomer of the polymer and the monomer or oligomer is polymerized. The intercalated silicate is described as having a layer thickness of 7 to 12 angstroms and an interlayer distance of about 20 angstroms.

In WO 93/111900, an alternative method of forming a composite is described in which an intercalated layered particulate material having reactive organosilane compounds is dispersed in a thermoplastic polymer or vulcanizable rubber. Furthermore, additional composites containing these so-called nanofillers and/or their methods of preparation are described in U.S. Pat. Nos. 4,739,007; 4,618,528; 4,528,235; 4,874,728; 4,889,885; 4,810,734; 4,889,885; 4,810,734; and 5,385,776 German Patent 3808623; Japanese Patent J02208358; European Patent Applications 0398551; 0358415; 0352042; and 0398551 and J. Inclusion Phenomena 5,473 (1987); Clay Minerals, 23, (1988), 27; Polym. Preprints, 32 (April 1991), 65-66; Polym. Prints, 28, (August 19987), 447-448; and Japan Kokai 76,109,998.

The principle of utilizing a layered clay to enhance or improve the properties of a polymer matrix in which the clay has been dispersed has also been reported. U.S. Pat. No. 4,739,007 describes the use of a composite material comprising a polyamide matrix and well-dispersed silicate layers exhibiting high mechanical strength and excellent high temperature properties. As reported therein, it was believed that the clay particles in a nylon nanocomposite induce crystallization. It was also proposed that the polymer/clay nanocomposite upon processing leads to crystallization of the matrix polymer around the dispersed particles.

Nanofillers are also available based on tiny platelets of a special type of surface modified clay called montmorillonite. The two manufacturers in the United States, Nanocor and Southern Clay Products, both point to increases in flexural modulus, heat distortion temperature and barrier properties with the addition of such filler in selected polymers. Montmorillonite clays are reportedly hydrophilic in nature and are a naturally occurring raw material found in abundance in the USA. They are generally found in Wyoming, Montana and the Dakotas. The clays are mined and then processed into commercially available end products. The typical process control factors in the refining of the clay are:

Solid/water ratio
  Counter ion optimization
  Purity
  Pre-organic reaction particle size
  Organic/inorganic ratio
  Post-organic reaction dispersive characteristic
  Post-milling solids/Moisture ratio
  Post-milling dispersive characteristics
  Post-milling particle size The various organic compounds that are typically used to treat this clay are ammonium cations. These cations are used to minimize the attractive forces between the agglomerated clay platelets. The typical agglomerated platelets are separated by a distance of approximately 3.5 angstroms. The cation treatment presumably acts on the platelets to separate them. The separation distance will depend on the cation molecule used. Typically a distance of about 20 angstroms can be achieved. This intercalation process opens the spacing between the platelets enough so that the monomer or polymer can penetrate between the platelet layers. Without this, the reinforcing nature of the platelets will not occur.

The final step in making the polymer nanocomposite is, not surprisingly, either the process of combining the clay and polymer in a reactor in situ or by melt compounding the clay into the polymer using an extruder. In either case, sufficient shearing action in the reactor or twin screw extruder will determine the extent of exfoliation and dispersion of the nanoclay.

Turning next to a general discussion of catheters, for which the present invention finds particular application, it is noted that catheter designers are constantly faced with the challenge of making smaller diameter, thin walled catheters with increasing performance requirements. These catheters often need to have varying mechanical properties along their length to allow for manipulation of the device from a location several feet away from where the "action" is. For example, in a diagnostic electrophysiology catheter (see FIG. 1), the catheter shaft 10 needs to be flexible at the distal tip 12 to provide for deflection of the tip within the heart. The section in the middle of the shaft 14 needs to be somewhat stiffer in order to provide enough column stiffness to push the deflectable tip through the tortuous anatomy. The most proximal section 16 needs to be somewhat stiffer still to provide for maneuverability (pushability and torqueability) of the device from a distance of about a meter away from the catheter tip.

Polyurethanes, nylons, polyether block amide copolymers, and polyester elastomers are among the materials commonly used in the manufacture of such catheters. Furthermore, in order to achieve varying properties along the length of the catheter, segments of differing materials are usually welded, bonded, or intermittently extruded in a single catheter shaft. The ability to join these differing materials is a primary concern in selecting the materials for catheter shaft design. It is important that the adjacent materials be compatible for joining by the manufacturing process used and not detach during medical use. However, joining together differing materials can cause added thickness and rigidity at the joining points. In addition, fusion bonding can cause crystallization at the bonding points which may add stiffness.

Historically, material choices (whether for a catheter or any other application) have been somewhat limited by the offerings of material suppliers. For example, when evaluating the flexural modulus between grades of polyether block amide copolymer, it is not uncommon to find that the flexural modulus approximately doubles for each sequential commercial grade offered. Therefore, in order to achieve an intermediate stiffness, designers have been forced to blend different grades of these materials or choose materials from a different polymer family in order to secure the balance of properties required by their specific catheter designs. This in turn can have a negative impact on processability of the materials during manufacturing and often results in a net reduction on the overall balance of the physical, thermal and barrier properties of the final blended polymer.

U.S. Pat. No. 5,584,821 discloses an angiographic catheter which has a relatively stiff though flexible shaft and a soft tip. The soft tip consists primarily of a tungsten loaded polyether block amide (PEBA) copolymer surrounded by two thin PEBA layers. This three ply radiopaque tip is bonded to a PEBA shaft. The shaft is reinforced either by an inner nylon ply or by metal braiding.

Similarly, when it comes to the production of a soft tip catheter with a relatively stiffer body, U.S. Pat. No. 5,584,821 emphasizes that the stiffer body portion relies upon the use of a metal braided reinforced PEBA copolymer or a co-extruded two ply wall consisting of nylon and PEBA copolymer. That being the case, it becomes clear that inasmuch as PEBA type copolymers are widely used in catheter type applications, it would serve a long-standing need if one could conveniently produce a more rigid and toughened PEBA catheter, without the need for the structural modifications emphasized in the prior art.

Thus, there remains a need in the art for a single polymer that can offer a balance of properties such that only the filler level may need to be varied to provide a catheter which is contiguous and not liable to detach or come apart during use.

Use of copolymers such as nylon block copolymers containing polyamide segments and elastomeric segments has been reported in U.S. Pat. No. 4,031,164. Cross-linked nylon block copolymers are described in U.S. Pat. Nos. 4,671,355 and 5,198,551. Radiation cross-linked nylon block copolymers are described in U.S. Pat. Nos. 5,993,414 and 5,998,551 and in U.S. application Ser. No. 10/129,921 which are all assigned to the assignee of the present invention and included herein by reference.

Accordingly, it is an object of this invention to provide a nylon/nanoclay composition which has a unique synergy in properties and which can provide particular utility as one or more components of a medical catheter product.

More specifically is an object of the present invention to provide a nylon 12/nanoclay composition wherein the composition exhibits improvements in properties such as flexural modulus, tensile modulus and impact strength while maintaining ductility and elongation even at relatively high nanoclay loadings. Thus, a balance of flexibility and stiffness would be achieved which makes the composition particularly useful as a catheter or similar surgical instrument due to the unique balance of properties obtained.

These and other objects of the present invention, together with the advantages thereof over the prior art, which shall become apparent from the specification that follows, are accomplished by the invention as hereinafter described and claimed.

SUMMARY OF THE INVENTION

In a first embodiment, the present invention relates to a method for modifying the properties of a nylon block copolymer comprising supplying a nylon block copolymer wherein said nylon block copolymer has a flexural modulus, a tensile modulus, and an unnotched Izod impact strength. This is followed by incorporating into said nylon block copolymer a nanoclay filler wherein said nanoclay filler is present at a level of between about 1.0-20.0 wt. %. The filler is added to thereby increase the values of said flexural modulus, tensile modulus, while substantially maintaining the value of said unnotched Izod impact strength and/or increasing the value of said unnotched Izod impact strength. In addition, should the nylon block copolymer have an ultimate elongation expressed in percent elongation, the addition of nanoclay filler is such that while dropping to levels of at or greater than 50.0% of its original value, the percent elongation may nonetheless be maintained to a level of +/−15.0% over the nanoclay filler level of about 1.0-20.0 wt. %.

In a second related embodiment, a method for manufacturing an intravascular catheter is described, having a tubular shaft, and a soft flexible tip distal thereof, formed from a nanocomposite, comprising supplying a nanocomposite comprising a nylon block copolymer and a nanoclay. The nanoclay is adjusted to at a level of between about 1.0-20.0 wt %, and wherein said nylon block copolymer has a flexural modulus, tensile modulus and unnotched Izod impact strength, and wherein the presence of said nanoclay filler is selected to increase the values of said nylon block copolymer's flexural modulus, tensile modulus, while substantially maintaining the value of the unnotched Izod impact strength and/or increasing the value of said unnotched Izod impact strength, and forming said intravascular catheter.

In a third related embodiment, the present invention is directed at a method for manufacturing a balloon catheter having a tubular shaft, and an integrally formed balloon section formed of a nanocomposite. The method comprises supplying a nanocomposite comprising a nylon block copolymer and a nanoclay, wherein said nanoclay is present at a level of between about 1.0-20.0 wt %, and wherein said nylon block copolymer has a flexural modulus, tensile modulus and unnotched Izod impact strength, and wherein the presence of said nanoclay filler is selected to increase the values of said nylon block copolymer's flexural modulus, tensile modulus, while substantially maintaining the value of the unnotched Izod impact strength and/or increasing the value of said unnotched Izod impact strength, and forming said balloon catheter from said nanocomposite.

BRIEF DESCRIPTION OF THE DRAWINGS

To better understand and appreciate the invention, refer to the following detailed description in connection with the accompanying drawing.

DESCRIPTION OF PREFERRED EMBODIMENTS

Figure 1:
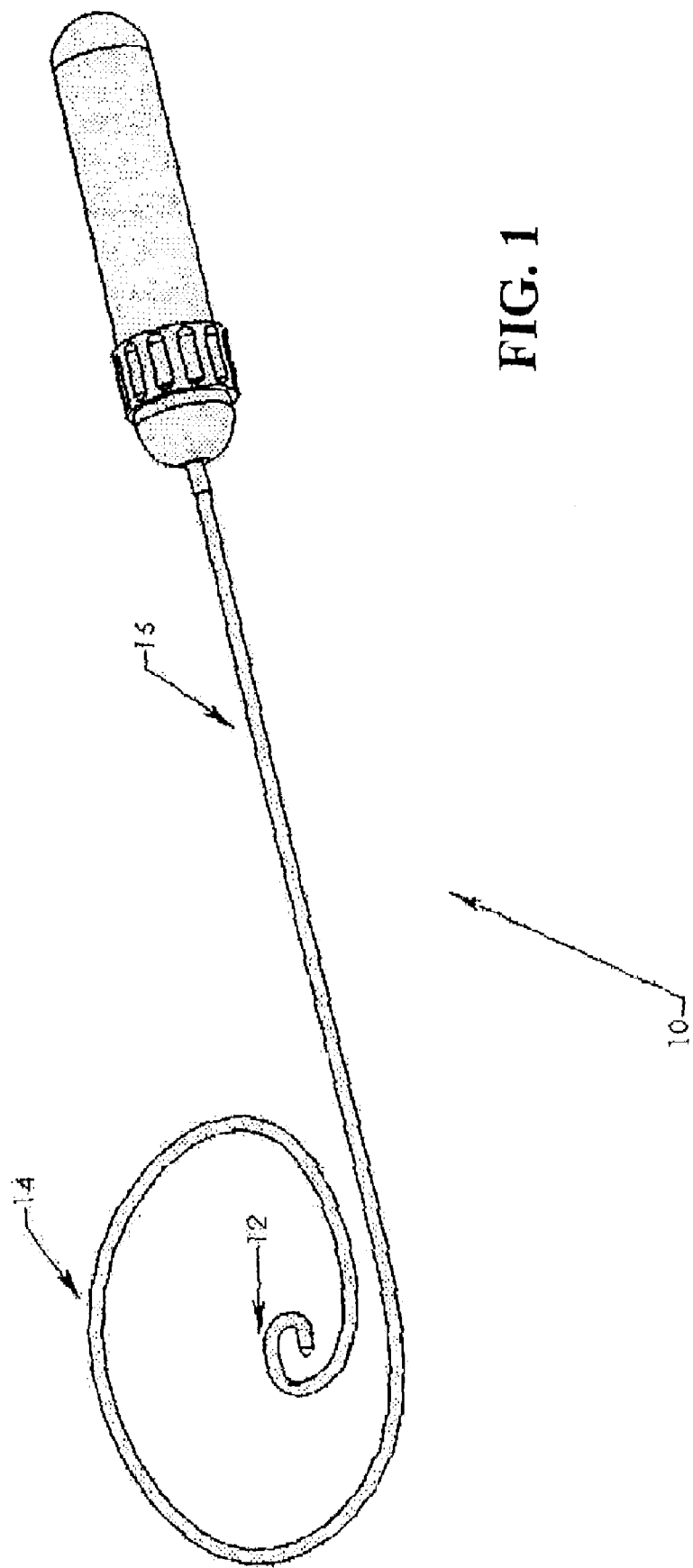
FIG. 1 is a perspective view of an epidermal catheter according to the present invention.

The invention relates to a nanocomposite comprising nylon block copolymer and montmorillonite clay which has been found to provide a surprising balance of physical properties, particularly stiffness and ductility. The nanocomposite may be formed into a surgical instrument, like a catheter, comprising any or all of the balloon section, the flexible distal end and the main shaft, yielding a device of a single composition which does not have the usual potential for separation along welded or bonded seams or joints. A nanoclay loading of from about 1% to about 20% provides an increase in flexural modulus along with an increase in tensile modulus and the unnotched Izod impact strength also either increased or remained substantially unchanged. In addition, elongation, while decreasing, remained nearly constant (+/−15.0%) regardless of the nanoclay loading from 1% to 15%, and was maintained at greater than 50% of the unfilled nylon elongation value.

Preferably, the nylon block polymer is a polyether block amide (PEBA) copolymer such as Pebax™ 7233SA01 from Atofina. PEBA copolymers are frequently used to form catheters due to their coefficient of friction and flexibility, but must be stiffened to reduce their potential to kink, either by the inclusion of a spiral wound wire core or by chemical bonding sections of different materials together.

Using a Werner Pfleiderer ZSK 30 mm co-rotating twin screw extruder, montmorillonite clay was compounded into a nylon 12 homopolymer, Rilson AESNO™, as well as into the Pebax™ 7233SA01 copolymer, at levels from about 1% to about 15% by weight of the clay to the polymer. The resultant extrudate was pelletized and dried. Samples were then injection molded using a standard ASTM test mold and upon cooling, cut into test specimens for tensile, flexural and impact testing.

Table I shows the results for the homopolymer nanocomposite and Table II for the nylon block copolymer nanocomposite.

TABLE 1

| Property | % Nano Clay | | | | | | |
|---|---|---|---|---|---|---|---|
| | 0 | 1 | 3 | 6 | 9 | 12 | 15 |
| Flexural Modulus (MPa) | 1241 | 1449 | 1566 | 1845 | 2137 | 2188 | 2498 |
| Tensile Modulus (MPa) | 1099 | 1199 | 1334 | 1383 | 1633 | 1667 | 1807 |
| Elongation (%) | 340 | 131 | 131 | 135 | 118 | 130 | 20 |
| Break Stress (MPa) | 61 | 58 | 50 | 50 | 58 | 53 | 26 |
| Yield Stress (MPa) | 41 | 48 | 58 | 59 | 59 | 58 | 64 |
| Impact Resistance (J/m) | 48 | 82 | 67 | 52 | 43 | 35 | 33 |
| Melt Index, 275° C./5.0 kg | 28.5 | 32.5 | 65 | 73.3 | 33.5 | 0.66 | 0.07 |
| Viscosity (Pa-s) @ 100 s$^{-1}$, 235° C. | 13441 | 12233 | 7389 | 5862 | 6234 | 7478 | 8504 |
| Actual Nano Clay (%) | 0 | 1.0 | 3.1 | 5.3 | 8.6 | 12.2 | 15.8 |

TABLE 2

| Property | % Nano Clay | | | | | | |
|---|---|---|---|---|---|---|---|
| | 0 | 1 | 3 | 6 | 9 | 12 | 15 |
| Flexural Modulus (MPa) | 738 | 874 | 1002 | 1258 | 1511 | 1774 | 1974 |
| Tensile Modulus (MPa) | 62 | 609 | 656 | 784 | 859 | 936 | 1033 |
| Elongation % | 360 | 187 | 198 | 190 | 217 | 209 | 185 |
| Break Stress (MPa) | | 43 | 52 | 49 | 54 | 48 | 35 |
| Yield Stress (MPa) | | 47 | 48 | 54 | 55 | 60 | 61 |
| Impact Resistance (J/m) | 75 | 67 | 71 | 82 | 140 | 161 | 178 |
| Melt Index, 275° C./5.0 kg | 110 | 66.6 | 55.2 | 65.9 | 34.8 | 14.8 | 6.8 |
| Viscosity (Pa-s) @ 100 s$^{-1}$, 235° C. | 5412 | 7220 | 7608 | 7519 | 7877 | 7917 | 7799 |
| Actual Nano Clay (%) | 0 | 1.0 | 2.7 | 5.6 | 9.3 | 12.9 | 15.9 |

With the nylon 12 homopolymer, Table I, flexural modulus (ASTM D790) and tensile modulus (ASTM D638) steadily increased with higher loadings of nanoclay to essentially double the values for the unfilled homopolymer at a loading of 15.8% nanoclay. Unnotched Izod impact resistance (ASTM D256) increased initially and maintained a level above that of the unfilled homopolymer until loadings above 6% nanoclay were reached, at which point the impact strength fell off somewhat. Elongation however, dropped off substantially (by more than one half of the unfilled value) at even low levels of nanoclay, to a value of 20% at the 15.8% nanoclay loading.

By contrast, the nylon block copolymer/nanoclay composite surprisingly showed a much better balance of properties (see Table II). Flexural modulus nearly tripled at 15.9% nanoclay loading. Tensile modulus increased nearly ten-fold with low levels of nanoclay loading and was only slightly affected by increased loading. Unnotched Izod impact resistance remained nearly unchanged from the unfilled copolymer at low loadings of nanofiller, but was more than doubled at high (10%+) filler loading. In addition, the elongation values for the nanofilled copolymer, while dropping upon filling with nanoclay, maintained itself as nearly constant regardless of the filler level used (from 1% to 15.9% loading) and the value for the filled copolymer was in generally greater than one half of the value (360%) of the unfilled copolymer.

The addition of nanoclay therefore significantly improved the stiffness of both the homopolymer and the copolymer. However, for the copolymer, a balance of flexibility and stiffness was uniquely achieved. Thus, higher nanoclay loadings now provide a nanocomposite catheter that is less susceptible to embrittlement or kinking. This provides a stiff, tough material having good ductility which can be tailored for use over the entire length of the catheter, eliminating the use of different materials. Either by sequentially co-extruding nylon with different nanoclay levels or by melt bonding together sections of extruded copolymer having different nanoclay levels, a catheter of a single polymer can be provided that has the combination of ductility and stiffness required. In some instances, a single nanoclay level may provide the balance of properties for the entire catheter. Additionally, with the use of a single polymer whose clarity is relatively unaffected by filler level, laser bonding may be achieved without the need for compatibilizing agents.

Accordingly, the composition and method disclosed herein provide a nanocomposite composition having an excellent balance of stiffness, ductility and impact properties, particularly suited for the production of novel catheter products without the need for structural modification or the use of different materials or multiply layers, as disclosed and emphasized in the prior art.

The description and drawings illustratively set forth the presently preferred invention embodiment. We intend the description and drawings to describe this embodiment and not to limit the scope of the invention. Obviously, it is possible to modify these embodiments while remaining within the scope of the following claims. Therefore, within the scope of the claims one may practice the invention otherwise than as the description and drawings specifically show and describe.

What is claimed is:

1. A method for modifying the properties of a nylon block copolymer comprising:
   (a) supplying a nylon block copolymer wherein said nylon block copolymer has a flexural modulus, a tensile modulus, and an unnotched Izod impact strength, wherein said nylon block copolymer comprises a polyamide segment and a polyether segment;
   (b) incorporating into said nylon block copolymer a nanoclay filler wherein said nanoclay filler is present at a level of between about 1.0-20.0 wt % and wherein said nanoclay is treated with a cation; and
   (c) increasing the values of said tensile modulus at least 980 percent and substantially maintaining the value of said unnotched Izod impact strength and/or increasing the value of said unnotched Izod impact strength, upon addition of said nanoclay filler.

2. The method of claim 1 wherein said nanoclay is montmorillonite.

3. The method of claim 1, further including supplying a nylon block copolymer which has an ultimate elongation expressed in percent elongation, and wherein, upon addition of said nanoclay filler, the percent elongation decreases but is maintained to a level of +/−15.0% over the nanoclay filler level of 1.0-20.0 wt %.

4. A method for manufacturing an intravascular catheter having a tubular shaft, and a soft flexible tip distal thereof, formed from a nanocomposite, comprising supplying a nanocomposite comprising a nylon block copolymer and a nanoclay treated with a cation, wherein said nanoclay is present at a level of between about 1.0-20.0 wt %, and wherein said nylon block copolymer has a flexural modulus, tensile modulus and unnotched hod impact strength, and wherein the presence of said nanoclay filler is selected to increase the values of said nylon block copolymer's tensile modulus at least 980 percent, while substantially maintaining the value of the unnotched Izod impact strength and/or increasing the value of said unnotched hod impact strength, and forming said intravascular catheter.

5. The method of claim 4 wherein said nanoclay filler is montmorillonite.

6. The method of claim 4, further including supplying a nylon block copolymer which has an ultimate elongation expressed in percent elongation, and wherein, upon addition of said nanoclay filler, the percent elongation decreased but is maintained to a level of +/−15.0% over the nanoclay filler level of 1.0-20.0 wt %.

7. The method of claim 4 wherein said nylon block copolymer comprises a block copolymer containing a polyamide segment and a polyether segment.

8. A method for manufacturing a balloon catheter having a tubular shaft, and an integrally formed balloon section formed of a nanocomposite, comprising supplying a nanocomposite comprising a nylon block copolymer and a nanoclay treated with a cation, wherein said nanoclay is present at a level of between about 1.0-20.0 wt %, and wherein said nylon block copolymer has a flexural modulus, tensile modulus and unnotched hod impact strength, and wherein the presence of said nanoclay filler is selected to increase the values of said nylon block copolymer's tensile modulus at least 980 percent, while substantially maintaining the value of the unnotched Izod impact strength and/or increasing the value of said unnotched Izod impact strength, and forming said balloon catheter from said nanocomposite.

9. The method of claim 8 wherein said nanoclay filler is montmorillonite.

10. The method of claim 8, further including supplying a nylon block copolymer which has an ultimate elongation expressed in percent elongation, and wherein, upon addition of said nanoclay filler, the percent elongation decreases but is maintained to a level of +/−15.0% over the nanoclay filler level of 1.0-20.0 wt %.

11. The method of claim 8 wherein said nylon block copolymer comprises a block copolymer containing a polyamide segment and a polyether segment.

* * * * *

UNITED STATES PATENT AND TRADEMARK OFFICE
CERTIFICATE OF CORRECTION

| | | |
|---|---|---|
| PATENT NO. | : 7,279,521 B2 | Page 1 of 1 |
| APPLICATION NO. | : 10/379763 | |
| DATED | : October 9, 2007 | |
| INVENTOR(S) | : Acquarulo, Jr. et al. | |

It is certified that error appears in the above-identified patent and that said Letters Patent is hereby corrected as shown below:

On the Title page, in field (63), under "Related U.S. Application Data", in column 1, line 2, before "filed" insert -- filed on Feb. 5, 2003, --.

On the Title page, in field (56), under "Other Publications", in column 2, line 1, delete "Couting" and insert -- Counting --, therefor.

In column 8, line 18, in Claim 4, delete "hod" and insert -- Izod --, therefor.

In column 8, line 23, in Claim 4, delete "hod" and insert -- Izod --, therefor.

In column 8, line 43, in Claim 8, delete "hod" and insert -- Izod --, therefor.

Signed and Sealed this

Twenty-sixth Day of August, 2008

JON W. DUDAS
*Director of the United States Patent and Trademark Office*